United States Patent
Alikhani

(10) Patent No.: US 9,426,132 B1
(45) Date of Patent: Aug. 23, 2016

(54) METHODS AND APPARATUS FOR RULES-BASED MULTI-FACTOR VERIFICATION

(71) Applicant: EMC Corporation, Hopkinton, MA (US)

(72) Inventor: Kayvan Alikhani, Oakland, CA (US)

(73) Assignee: EMC Corporation, Hopkinton, MA (US)

( * ) Notice: Subject to any disclaimer, the term of this patent is extended or adjusted under 35 U.S.C. 154(b) by 114 days.

(21) Appl. No.: 14/025,377

(22) Filed: Sep. 12, 2013

Related U.S. Application Data

(60) Provisional application No. 61/699,961, filed on Sep. 12, 2012, provisional application No. 61/699,966, filed on Sep. 12, 2012.

(51) Int. Cl.
*H04L 29/06* (2006.01)

(52) U.S. Cl.
CPC .................... *H04L 63/061* (2013.01)

(58) Field of Classification Search
CPC ....... G06F 21/31; H04L 63/08; H04L 63/083; H04L 9/32; H04L 63/0861; H04L 63/061
USPC ........................................................... 726/7
See application file for complete search history.

(56) References Cited

U.S. PATENT DOCUMENTS

| | | |
|---|---|---|
| 4,449,189 A | 5/1984 | Feix et al. |
| 4,975,969 A | 12/1990 | Tal |
| 4,993,068 A | 2/1991 | Piosenka et al. |
| 5,235,642 A | 8/1993 | Wobber et al. |

(Continued)

FOREIGN PATENT DOCUMENTS

| | | |
|---|---|---|
| EP | 2385679 A1 | 11/2011 |
| WO | 2004075097 A1 | 9/2004 |

(Continued)

OTHER PUBLICATIONS

Google Play, "Battlenet Mobile Authenticator," https://play.google.com/store/apps/details?id=com.blizzard.bma&hl=en, Mar. 2012, 2 pages.

(Continued)

*Primary Examiner* — Mahfuzur Rahman
*Assistant Examiner* — Narciso Victoria
(74) *Attorney, Agent, or Firm* — Ryan, Mason & Lewis, LLP

(57) ABSTRACT

In one embodiment, a verification platform is adapted for communication with at least a first device. The verification platform receives a verification request from the first device, identifies one or more verification rules previously established by a user of the first device for processing of the verification request, sends a notification regarding the one or more verification rules, receives verification input responsive to the notification, and grants or denies the verification request based at least in part on the received verification input. The verification rule or rules specify multiple distinct types of verification selected by the user, and a sequence in which the selected verification types are to be applied in processing the verification request. The verification request may be generated in conjunction with an attempted launch of a designated application on the first device. The first device may comprise a mobile telephone, a computer or another type of device.

20 Claims, 13 Drawing Sheets

(56) References Cited

U.S. PATENT DOCUMENTS

| | | | |
|---|---|---|---|
| 5,761,329 A | 6/1998 | Chen et al. | |
| 6,463,474 B1 | 10/2002 | Fuh et al. | |
| 6,671,812 B1 | 12/2003 | Balasubramaniam et al. | |
| 6,724,919 B1 | 4/2004 | Akiyama et al. | |
| 6,856,800 B1 | 2/2005 | Henry et al. | |
| 7,173,604 B2 | 2/2007 | Marvit et al. | |
| 7,206,022 B2 | 4/2007 | Miller et al. | |
| 7,222,361 B2 | 5/2007 | Kemper | |
| 7,231,068 B2 | 6/2007 | Tibor | |
| 7,231,657 B2 * | 6/2007 | Honarvar et al. | 726/2 |
| 7,243,245 B2 | 7/2007 | Pagan | |
| 7,322,040 B1 | 1/2008 | Olson et al. | |
| 7,363,494 B2 | 4/2008 | Brainard et al. | |
| 7,480,655 B2 | 1/2009 | Thomas et al. | |
| 7,802,278 B2 | 9/2010 | Kweon | |
| 7,861,081 B2 | 12/2010 | Yeap et al. | |
| 7,882,386 B1 | 2/2011 | Potnis et al. | |
| 7,970,724 B1 | 6/2011 | Hauser | |
| 8,001,383 B2 | 8/2011 | Hughes | |
| 8,104,076 B1 * | 1/2012 | Lam et al. | 726/8 |
| 8,201,237 B1 | 6/2012 | Doane et al. | |
| 8,244,211 B2 | 8/2012 | Clark | |
| 8,249,577 B2 | 8/2012 | Chmaytelli et al. | |
| 8,347,370 B2 | 1/2013 | Headley | |
| 8,370,640 B2 | 2/2013 | Adams et al. | |
| 8,386,773 B2 | 2/2013 | Sherkin et al. | |
| 8,689,294 B1 | 4/2014 | Thakur et al. | |
| 8,776,190 B1 | 7/2014 | Cavage et al. | |
| 8,819,182 B2 | 8/2014 | Howarter et al. | |
| 2001/0047472 A1 | 11/2001 | Huntington et al. | |
| 2003/0084282 A1 | 5/2003 | Taruguchi | |
| 2004/0250135 A1 | 12/2004 | Haddad et al. | |
| 2005/0044044 A1 | 2/2005 | Burger et al. | |
| 2006/0015725 A1 | 1/2006 | Voice et al. | |
| 2006/0018481 A1 | 1/2006 | Nagano et al. | |
| 2006/0137016 A1 | 6/2006 | Margalit et al. | |
| 2006/0248083 A1 * | 11/2006 | Sack et al. | 707/9 |
| 2007/0192877 A1 | 8/2007 | Yoo et al. | |
| 2007/0300292 A1 | 12/2007 | Scipioni et al. | |
| 2008/0180212 A1 | 7/2008 | Aikawa et al. | |
| 2009/0077644 A1 | 3/2009 | Hammell et al. | |
| 2009/0309698 A1 | 12/2009 | Headley et al. | |
| 2009/0320123 A1 | 12/2009 | Yu et al. | |
| 2010/0005529 A1 | 1/2010 | Hemade | |
| 2010/0019026 A1 | 1/2010 | Hochfield et al. | |
| 2010/0299721 A1 | 11/2010 | Awamoto | |
| 2011/0078790 A1 | 3/2011 | Fazunenko et al. | |
| 2011/0258682 A1 | 10/2011 | Yin | |
| 2012/0011575 A1 | 1/2012 | Cheswick et al. | |
| 2012/0019361 A1 | 1/2012 | Ben Ayed | |
| 2012/0047563 A1 | 2/2012 | Wheeler | |
| 2012/0054875 A1 | 3/2012 | Antill | |
| 2012/0124662 A1 | 5/2012 | Baca et al. | |
| 2012/0182380 A1 | 7/2012 | Ohmae et al. | |
| 2012/0266258 A1 | 10/2012 | Tuchman et al. | |
| 2012/0317083 A1 | 12/2012 | Saxena et al. | |
| 2013/0055346 A1 * | 2/2013 | Singh et al. | 726/3 |
| 2013/0078952 A1 | 3/2013 | Yang | |
| 2013/0144788 A1 | 6/2013 | Sherkin et al. | |
| 2013/0227677 A1 | 8/2013 | Pal et al. | |
| 2014/0059675 A1 * | 2/2014 | Batie et al. | 726/19 |
| 2014/0187149 A1 | 7/2014 | Lortz et al. | |
| 2014/0331292 A1 | 11/2014 | Krieger et al. | |
| 2014/0379920 A1 | 12/2014 | Nathwani et al. | |
| 2015/0034718 A1 | 2/2015 | Marshall Chesney et al. | |

FOREIGN PATENT DOCUMENTS

| | | |
|---|---|---|
| WO | 2008094136 A1 | 8/2008 |
| WO | 2008144943 A1 | 12/2008 |
| WO | 2011157538 A1 | 12/2011 |

OTHER PUBLICATIONS

A. Bhargav-Spantzel et al., "Privacy Preserving Multi-Factor Authentication with Biometrics," 2nd ACM Workshop on Digital Identity Management (DIM), Nov. 2006, pp. 63-71.

* cited by examiner

METHODS AND APPARATUS FOR RULES-BASED MULTI-FACTOR VERIFICATION

PRIORITY CLAIM

The present application claims the priority of U.S. Provisional Patent Application Ser. No. 61/699,961 and 61/699,966 filed Sep. 12, 2012, which are incorporated by reference herein.

FIELD

The field relates generally to user verification, and more particularly to techniques for verifying the identity of a user of an electronic device.

BACKGROUND

In many verification systems, users are required to enter static passwords in order to prove their identity so as to gain access to a protected resource. Different applications, accounts or other types of protected resources associated with a given user may each require entry of distinct alphanumeric password, thereby necessitating that the user remember multiple such passwords in order to access the corresponding resources. This is not only unduly burdensome for the user, but can also undermine security in that the user will often write down the passwords or otherwise make them vulnerable to inadvertent disclosure.

It is also known to utilize interaction between multiple electronic devices in order to verify the identity of a given user. In verification systems of this type, the devices may temporarily pair with one another utilizing peer-to-peer communications based on short-range protocols such as Bluetooth. However, such communications require that the devices be in close proximity to one another. Moreover, the communications are usually not highly secure and therefore can be vulnerable to hacking.

SUMMARY

Illustrative embodiments of the present invention provide improved techniques for verification of user identity. Such arrangements exhibit significantly enhanced security relative to conventional arrangements while also avoiding the need for a user to remember multiple alphanumeric passwords. For example, in some embodiments, a rules-based multi-factor verification system comprises a verification platform in communication with at least one electronic device. The verification platform allows a user to establish rules for multi-factor verification that are carried out by the electronic device in order to verify user identity. The user does not need to remember passwords, as multiple distinct types of verification such as voice verification, face verification, location verification, motion verification and third party verification can be applied in accordance with rules established by the user through interaction with the verification platform. Such an arrangement provides multiple layers of protection while allowing the user to select the particular types of verification to be applied as well as the order in which the selected types of verification are applied.

In one embodiment, a verification platform is adapted for communication with at least a first device. The verification platform receives a verification request from the first device, identifies one or more verification rules previously established by a user of the first device for processing of the verification request, sends a notification regarding the one or more verification rules, receives verification input responsive to the notification, and grants or denies the verification request based at least in part on the received verification input. The one or more verification rules specify multiple distinct types of verification selected by the user and a sequence in which the selected types of verification are to be applied in processing the verification request.

The verification request may be generated in conjunction with an attempted launch of a designated application on the first device, with user access to the designated application on the first device being controlled responsive to the granting or denying of the verification request.

Other embodiments can be configured to utilize both first and second devices in communication with the verification platform. In these embodiments, there is no requirement that the two devices be in close proximity to one another, and security of the communications is enhanced, leading to reduced vulnerability to hacking relative to the above-noted conventional arrangements that utilize device pairing via short-range protocols.

The first and second devices may comprise mobile telephones, computers or other types of devices, in any combination.

Figure 1:
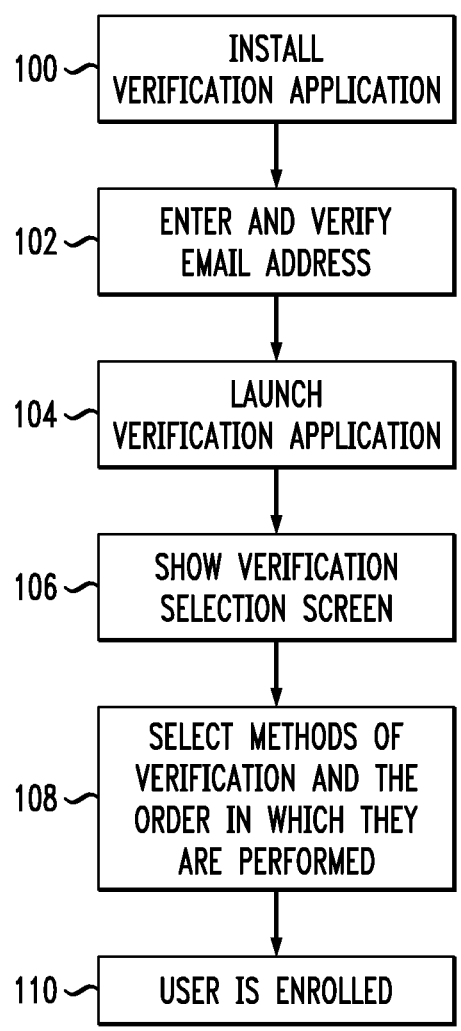
FIG. 1 is a flowchart for enrollment of a device with a verification service.

All illustrations of the drawings are for the purpose of describing exemplary embodiments of the present invention and are not intended to limit the scope of the present invention in any way.

DETAILED DESCRIPTION

Illustrative embodiments of the present invention will be described herein with reference to exemplary systems and associated verification platforms, user devices and other processing devices. It is to be appreciated, however, that the invention is not restricted to use with the particular illustrative system and device configurations shown. Accordingly, the term "communication system" as used herein is intended to be broadly construed, so as to encompass, for example, systems in which a single user device communicates with another processing device associated with a verification platform, systems in which at least two user devices each communicate with another processing device associated with a verification platform, and other types of systems.

A number of embodiments of the invention will be described with reference to the flow diagrams of FIGS. 1-11 and the communication system diagram of FIG. 12. A given such embodiment implements rules-based multi-factor verification of user identity using a verification service that is supported by a verification platform. The verification service interacts with a verification application installed on at least one user device. In some embodiments, the rules-based multi-factor verification utilizes only a single user device, while in other embodiments the rules-based multi-factor verification utilizes first and second user devices, also referred to herein as primary and secondary devices. Such devices in arrangements of the latter type may be considered examples of what are more generally referred to herein as simply first and second devices. Also, other embodiments can be adapted to utilize three or more user devices to perform identity verification.

It will be assumed for description of the flowcharts of FIGS. 1 through 11 that the rules-based multi-factor verification utilizes only a single user device, also referred to herein as a first device. The first device may be viewed as the primary device denoted in the exemplary system of FIG. 12. However, it will be apparent to those skilled in the art that the described arrangements can be adapted in a straightforward manner for use with primary and secondary user devices, or with three or more user devices.

The verification service is implemented using a verification platform that illustratively includes a verification platform application programming interface (API) and a verification platform server. The verification platform API supports communication with a verification agent implemented on the user device. The verification application on the user device illustratively includes a login screen, an application selection screen, and a verification selection screen, but numerous alternative screen arrangements or other types of user interfaces can be used in other embodiments.

The embodiments of FIGS. 1 through 12 may be viewed as more particular examples of arrangements in which the verification platform receives a verification request from the first device, identifies one or more verification rules previously established by a user of the first device for processing of the verification request, sends a notification regarding the one or more verification rules, receives verification input responsive to the notification, and grants or denies the verification request based at least in part on the received verification input. The one or more verification rules specify multiple distinct types of verification selected by the user and a sequence in which the selected types of verification are to be applied in processing the verification request.

The verification request may be generated, for example, in conjunction with an attempted launch of a designated application on the user device, and user access to the designated application on the user device may be controlled responsive to the granting or denying of the verification request. The designated application on the user device is also referred to herein as a "secure application" as its access from the user device is conditioned on satisfactory completion of rules-based multi-factor verification.

In the present embodiment, granting of the verification request requires that the user device be enrolled in the verification service supported by the verification platform. Such enrollment may also be referred to herein as involving enrollment of a corresponding user in the verification service.

An exemplary enrollment process for the user device is shown in FIG. 1. This process includes steps 100 through 110.

In step 100, the rules-based multi-factor verification application is installed on the device by a user. Once the verification application has been installed, the user registers an email address with the verification service and goes through an email verification process as indicated in step 102. When the email address has been verified the verification application is launched in step 104. The verification selection screen is presented in step 106, and the user is prompted via the verification selection screen as indicated at step 108 to select the desired methods of verification and the order in which they are performed. These verification methods are more generally referred to herein as distinct "types" of verification. By way of example, the user can select the types of verification he or she would like to use from a displayed list, and can also configure the particular manner in that the different types of verification are to be applied. The latter may involve the user specifying logic functions such as AND and OR between selected verification types that indicate the manner in which the selected verification types should be applied.

The available verification types in the present embodiment may comprise, for example, two or more of voice verification, face verification, location verification, motion verification and third party verification, although additional or alternative verification types may also be used. The particular verification types and their sequence of application may be selected based on the desired level of protection.

For example, a user could choose to require both face and voice verification to access to given secure application. In this case, the user selects the two verification types and specifies that they are to be applied in accordance with a logic AND function, such that both verification types must be satisfied in order to gain access to the secure application. Alternatively, the user could require face or voice verification. In this case, the user selects the two verification types and specifies that they are to be applied in accordance with a logic OR function, such that face verification would be attempted first and in the event that face verification fails, the device would attempt to authorize access using voice verification.

Such specifications are examples of what are more generally referred to herein as one or more "verification rules" established by a user. A given such verification rule or set of verification rules generally specifies multiple distinct types of verification selected by the user, and a sequence in which the selected verification types are to be applied in processing the verification request. Thus, the selection step 108 in the exemplary FIG. 1 process may be viewed as a user establishing one or more verification rules for rules-based multi-factor verification.

Additional or alternative selection functions can be provided by the verification selection screen or other interfaces in other embodiments. After the selections in step 108 the user device is enrolled in the verification service. Accordingly, the user associated with the device is considered enrolled as indicated in step 110.

In other embodiments, alternative enrollment processes may be used. For example, the selection of particular verification types and sequence in which those types should be applied can be managed through a web-based administrative interface. Such management can be used to generate verification rules for a given user or for groups of multiple users and may further involve adding or removing users from particular groups or otherwise updating verification rules responsive to user input or designated policies. These and other provisioning functions may therefore be performed by a user or a system administrator.

Figure 2:
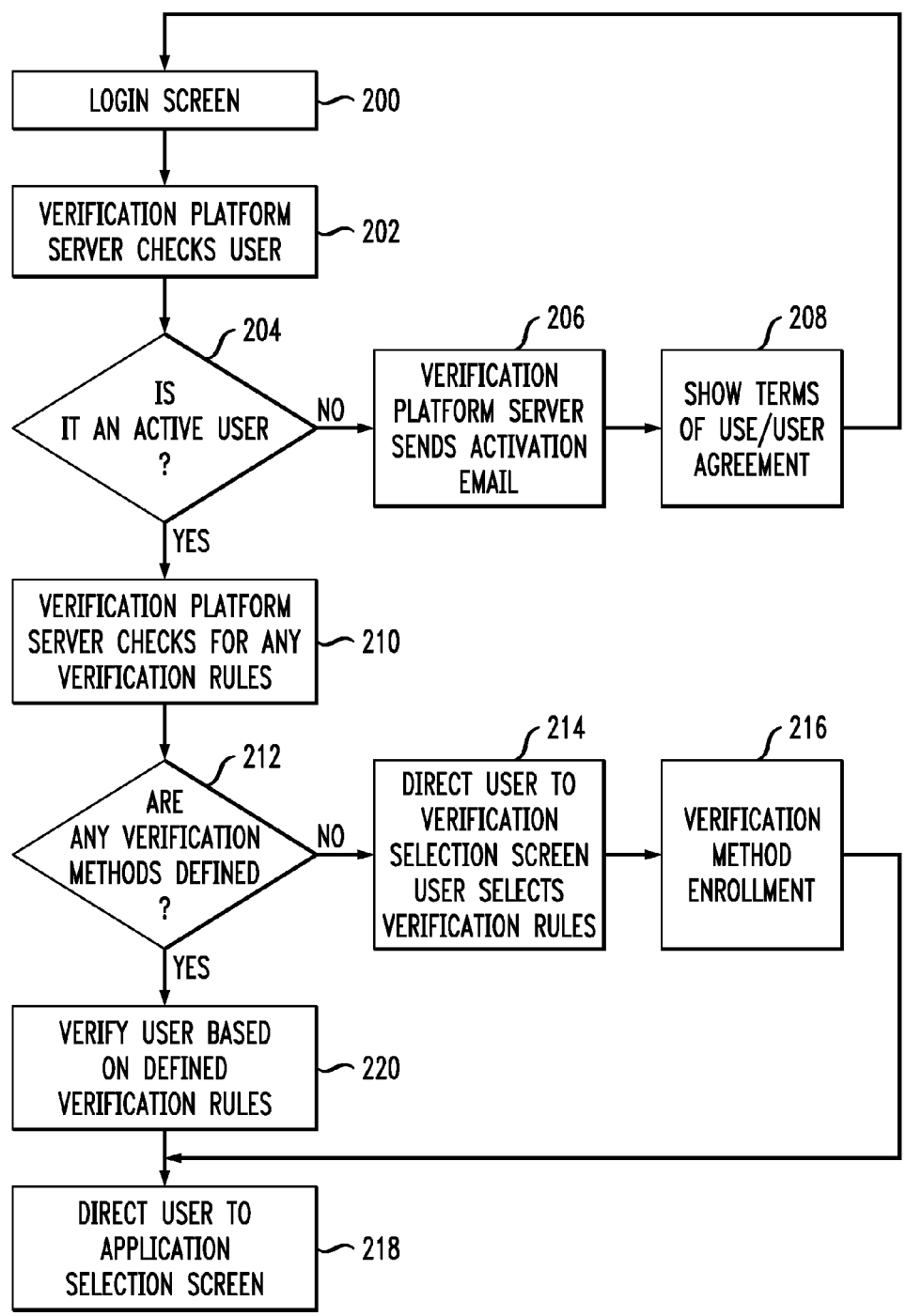
FIG. 2 is a flowchart for logging in to a verification application.

FIG. 2 shows a process for logging in to the verification application after it has been installed on the user device and the device has been enrolled in the verification service. This process includes steps 200 through 220.

In step 200, the login screen of the verification application is presented to the user. Responsive to input from the user, the verification platform server in step 202 checks the user. This illustratively involves determining in step 204 if the user is an active user. If the user is not an active user, the verification platform server sends an activation email in step 206, presents terms of use and a user agreement in step 208 and then returns the user to the login screen at step 200. If the user is determined in step 204 to be an active user, the verification platform server in step 210 checks for any verification rules for that user. This involves determining in step 212 if any verification methods are defined.

If there are no verification methods defined for the user, the user is directed in step 214 to the verification selection screen to select one or more verification rules in the manner previously described. Verification method enrollment is then completed in step 216 and the user is directed in step 218 to the application selection screen.

If it is determined in step 212 that there are verification methods defined for the user, the user is verified in step 220 based on the corresponding verification rules and then directed in step 218 to the application selection screen. Accordingly, after verification of the user in step 220 the user could be provided with access to a particular secure application via the application selection screen. Alternatively, selection of the particular secure application could automatically trigger the user verification portion of the process. As indicated above, a given "verification rule" as that term is broadly used herein includes specification of multiple verification types and a sequence in which those verification types are to be applied in verifying a user at the corresponding device.

Figure 3:
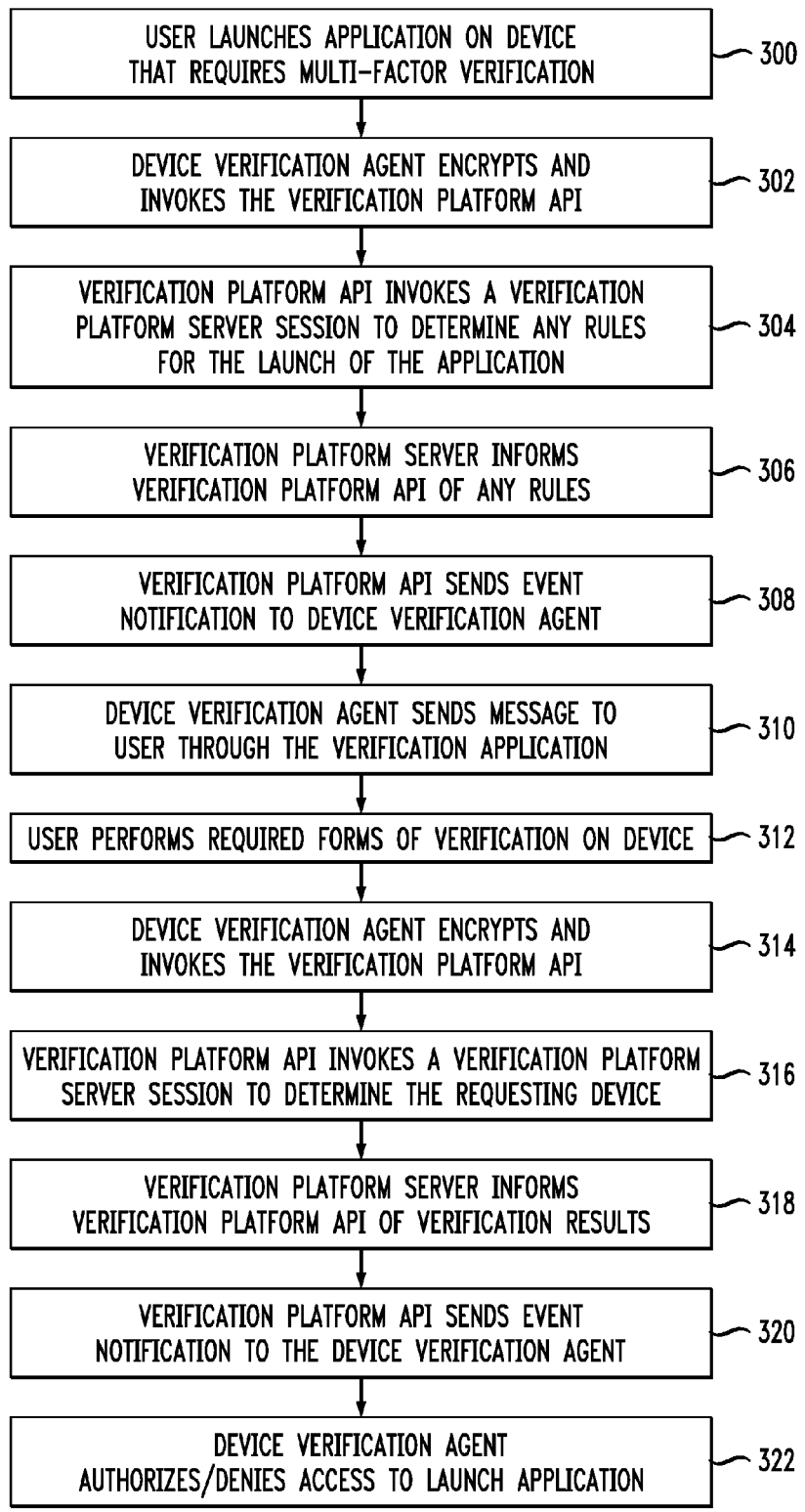
FIG. 3 is a flowchart of communication between the verification service and device.

Referring now to FIG. 3, a process for communication between the verification service and the user device in an illustrative embodiment is shown. It is assumed in this embodiment that the verification service is supported by a verification platform that includes a verification platform API and a verification platform server. The verification platform API is adapted for communication with a verification agent implemented on the user device. The verification platform API is assumed to be coupled to the verification platform server so as to support communications between these platform components. The process illustrated in FIG. 3 includes steps 300 through 322 as shown.

In step 300, a user attempts to access an application on the user device that requires rules-based multi-factor verification of the type described previously. As noted above, such an application on the user device is also referred to herein as a secure application. The verification application may be running in the background on the device, such that when an attempt is made to launch a secure application on the device, the user device verification agent intercepts the launch process.

The user device verification agent then encrypts a corresponding verification request and invokes the verification platform API in step 302. The verification platform API then invokes a verification platform server session in step 304 to determine any rules for the launch of the application. This is an example of what is more generally referred to herein as identifying one or more verification rules previously established by a user of a first device for processing of a verification request. In the event the user device verification agent determines that the verification platform server is non-responsive to the verification request, then a cached copy of the rule or rules may be used if available.

If one or more verification rules are found in step 304, the verification platform server informs the verification platform API in step 306 of any such rule or rules that must be met to launch the secure application, and the verification platform API sends an event notification to the user device verification agent in step 308. The verification application is provided with verification request notification in step 310. This illustratively involves displaying the verification request on the user device via the verification application, although other types of notifications regarding a given verification request may be used.

In response to such notification, the user performs the required forms of verification on the device in step 312, and the user device verification agent then encrypts the corresponding verification input and invokes the verification platform API in step 314. The verification platform API in step 316 invokes a verification platform server session to determine the requesting device and the validity of the verification input provided by that device. The verification input for each required verification type may be provided to the verification platform server in separate sessions or combined into a single session.

The verification platform server in step 318 informs the verification platform API of the verification results. The verification results are illustratively in the form of grant or denial of the initial verification request received from the user device in conjunction with the attempted launch of the secure application on that device. Alternatively, separate results can be provided for respective ones of the required verification types. The verification results are assumed to be provided in this embodiment in association with an identifier of the corresponding user device. The verification platform API then sends an event notification to the user device verification agent as indicated in step 320.

The user device verification agent in step 322 then either authorizes or denies the launch of the secure application on the user device. Thus, if the rules-based multi-factor verification is successful, the secure application can be accessed by the user. Otherwise, the user cannot access the secure application.

Communications between the verification agent and the verification platform API may utilize one or more of JavaScript Object Notation syntax, REpresentational State Transfer (REST) based client-server architecture and mutual client-server certificate-based encryption and authentication.

As a more particular example of communications of the latter type, a verification application acting as a client provides a certificate to the verification platform server and the server provides its certificate to the client. Both certificates are verified using a certificate authority, which has signed both the client and server certificates. The information is transmitted between the client and server over a Secure Socket Layer (SSL), using 128 bit or 256 bit Advanced Encryption Standard (AES) cipher encryption. The cipher encryption strength may be selected at least in part as a function of parameters such as device operating system type and transport capabilities, as well as other factors influencing the ability of a given device to support the desired encryption level.

It should be understood that the above-noted communication types are only examples, and numerous other communications may be used in other embodiments. Additional details regarding the above-noted AES techniques as well as examples of other cryptographic techniques suitable for use in providing secure communications in embodiments of the invention can be found in A. J. Menezes et al., Handbook of Applied Cryptography, CRC Press, 1997, which is incorporated by reference herein.

Figure 4:
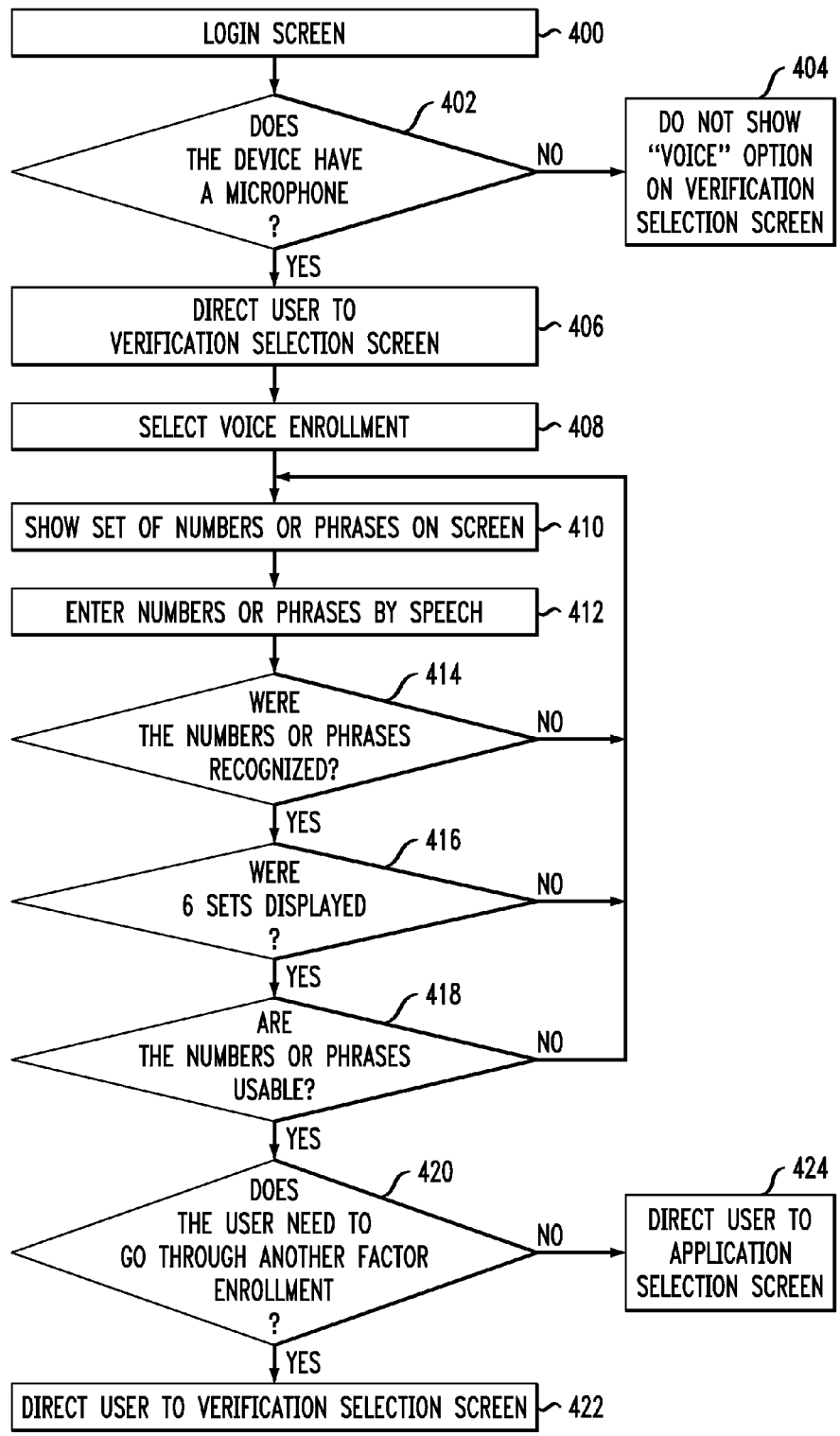
FIG. 4 is a flowchart for voice enrollment of the device with the verification service.
Figure 5:
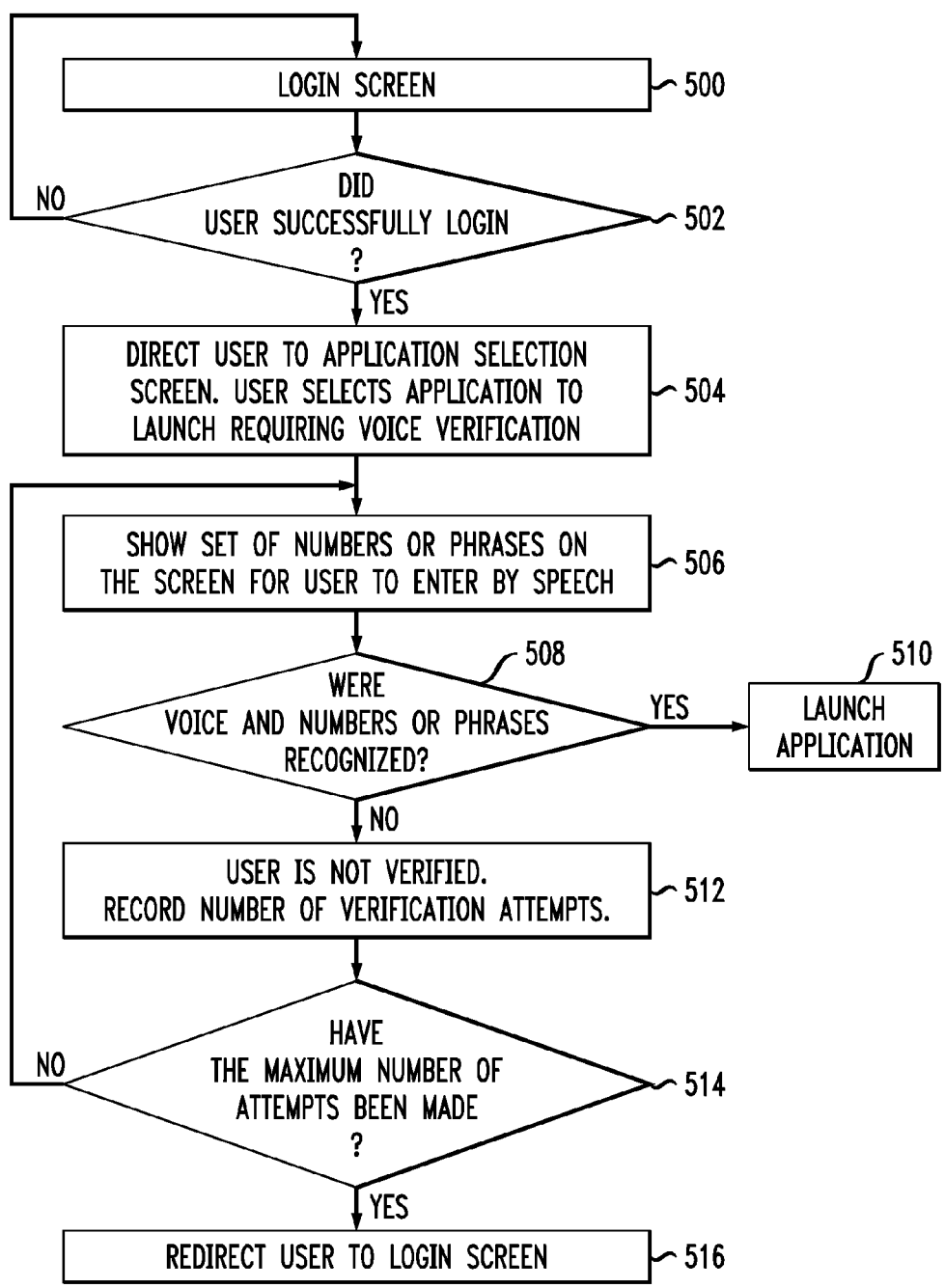
FIG. 5 is a flowchart for voice verification of the device through the verification application.
Figure 6:
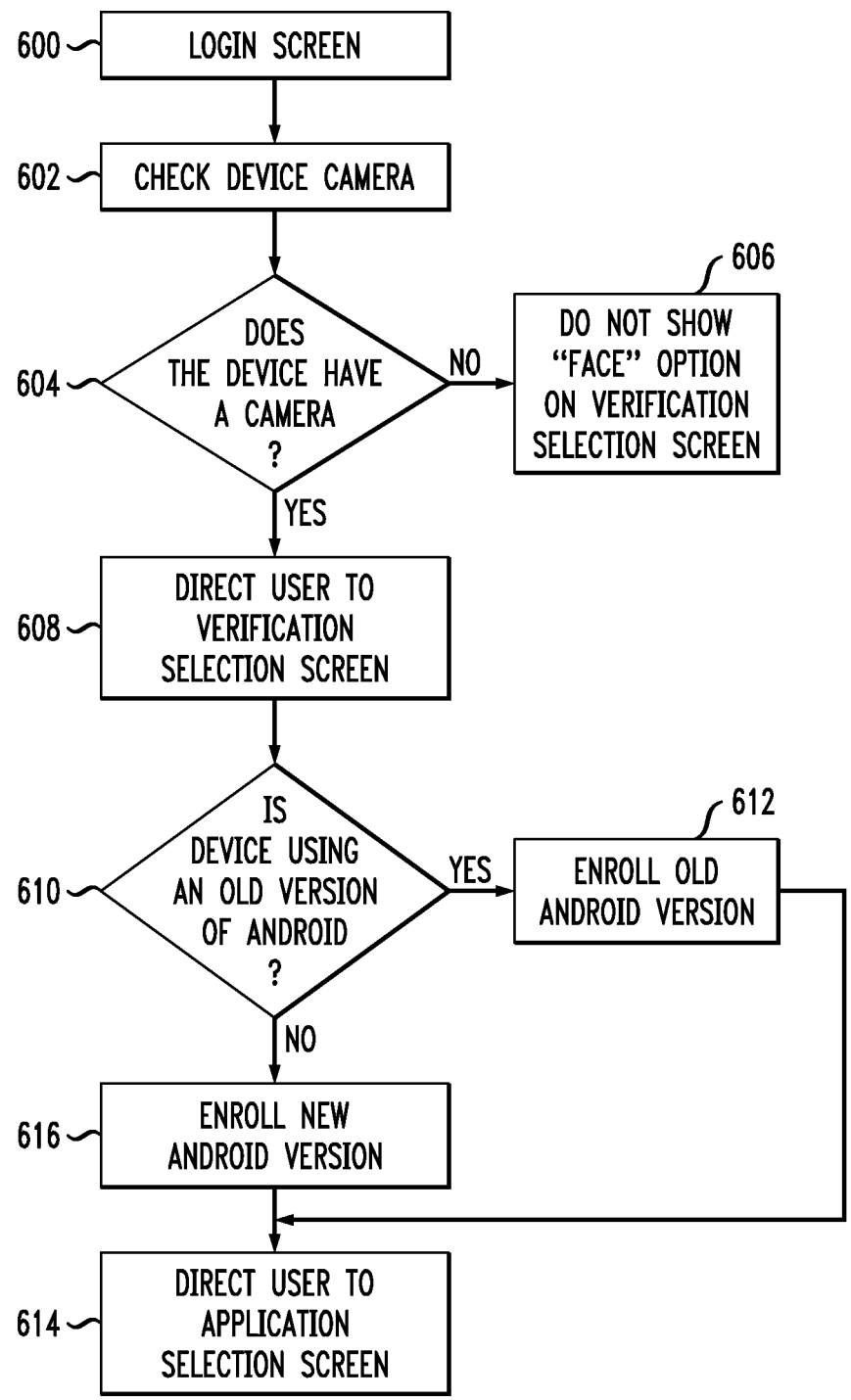
FIG. 6 is a flowchart for face enrollment of the device with the verification service.
Figure 7:
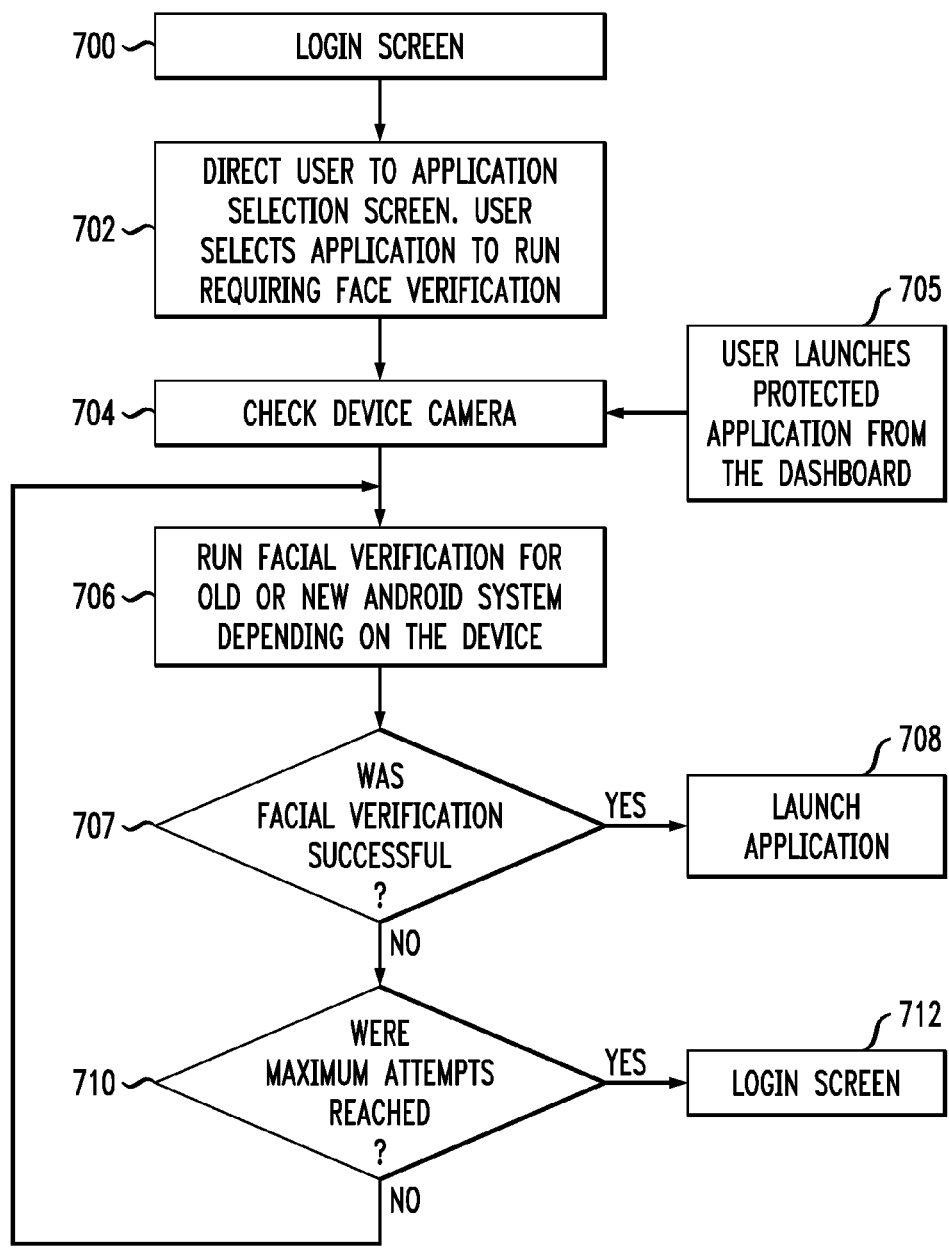
FIG. 7 is a flowchart for face verification of the device through the verification application.
Figure 8:
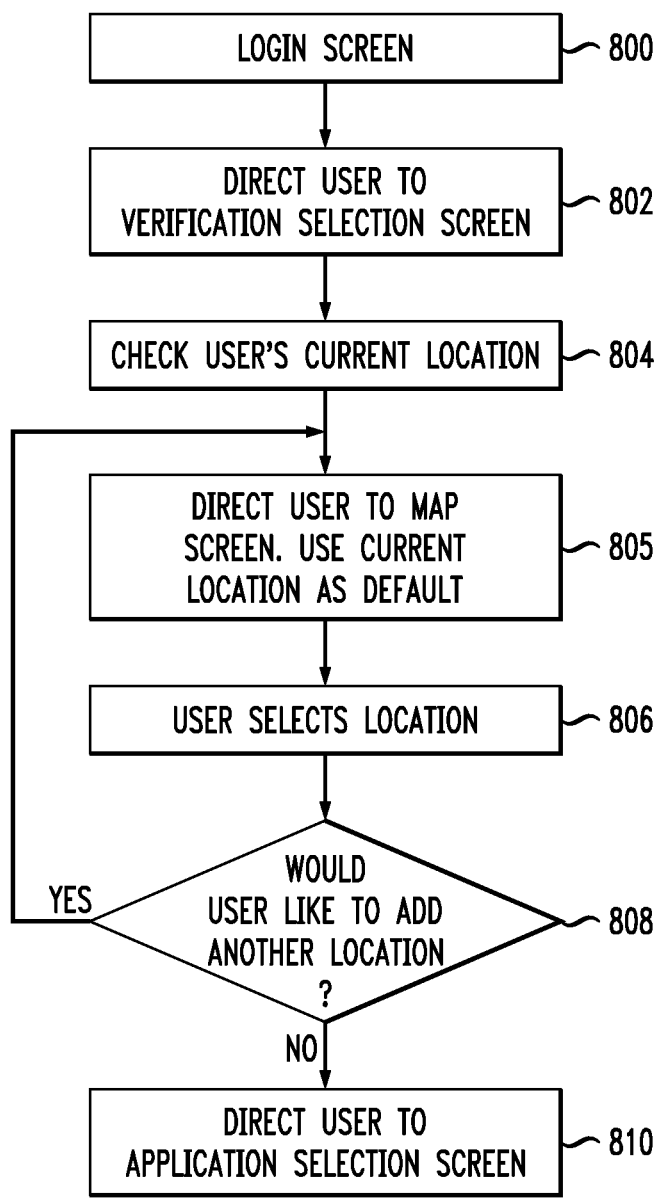
FIG. 8 is a flowchart for location enrollment of the device with the verification service.
Figure 9:
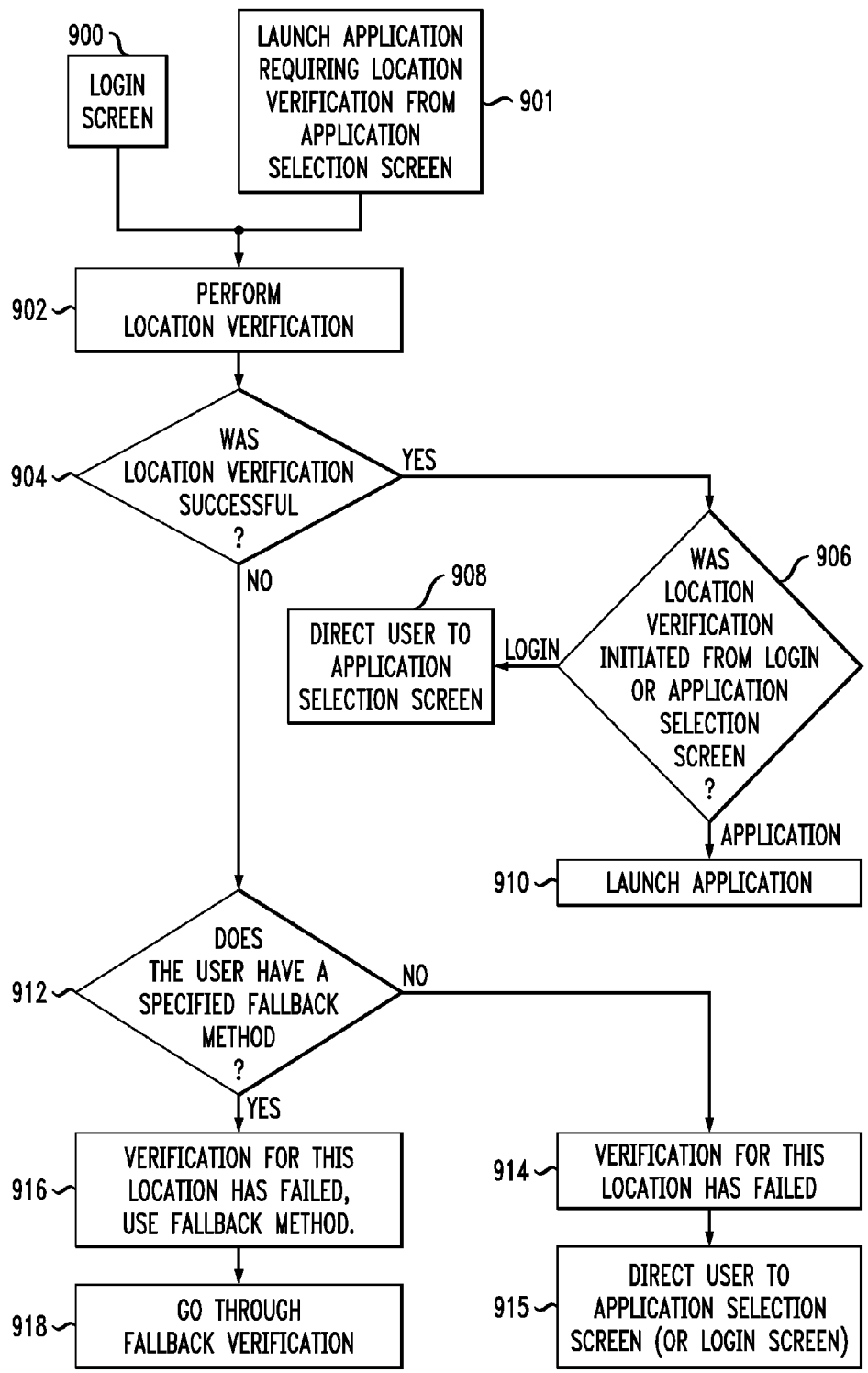
FIG. 9 is a flowchart for location verification of the device through the verification application.

As indicated above, a wide variety of different verification types may be made available for user selection as part of one or more verification rules in a given embodiment of the invention. Examples of enrollment and verification processes associated with particular verification types will now be described in conjunction with FIGS. 4 through 9. More specifically, FIGS. 4 and 5 illustrate voice enrollment and verification, FIGS. 6 and 7 illustrate face enrollment and verification, and FIGS. 8 and 9 illustrate location enrollment and verification. It is to be appreciated that similar enrollment and verification processes may be used for other verification types.

Referring initially to FIG. 4, an exemplary process is shown for voice enrollment of a user device with the verification service. The voice enrollment process includes steps 400 through 424 as shown.

In step 400, the user is presented with the login screen of the verification application. When the user logs in to the verification application, the verification application searches for a microphone on the device in step 402. If it is determined in step 402 that the device does not have a microphone, voice verification is not shown as a selectable option on the verification selection screen, as indicated in step 404. If it is determined in step 402 that the device does have a microphone, then voice verification is a selectable option on the verification selection screen, and the user is directed to that screen in step 406. If the user via the verification selection screen selects voice verification as one of the verification types and has not previously performed the voice enrollment process, the user is directed to select voice enrollment as indicated in step 408.

When voice enrollment is selected a set of numbers or phrases is displayed on the screen in step 410. For example, the set of numbers or phrases may include a total of five numbers or phrases, or other arrangements of multiple numbers or phrases. The user reads the displayed numbers or phrases into the device microphone in step 412. If the numbers or phrases are recognized in step 414 then another set of numbers or phrases is displayed on screen, until it is determined in step 416 that a total of six sets of numbers or phrases have been displayed and it is further determined in step 418 that all six sets of displayed numbers or phrases are usable. Although a total of six sets of numbers or phrases is used in this embodiment, other numbers of sets and set sizes can be used in other embodiments.

A negative determination in any of steps 414, 416 and 418 returns the process to step 410 to display another set. If six usable sets of numbers or phrases are obtained, the voice enrollment is complete. A determination is then made in step 420 as to whether or not the user needs to go through an enrollment process for another factor, such as face or location. If another such enrollment is needed, the user is directed to the verification selection screen in step 422, and otherwise is directed to the application selection screen in step 424.

FIG. 5 shows the corresponding voice verification process. The process includes steps 500 through 516 as shown.

In step 500, the user is presented with the login screen and upon determination of a successful login in step 502, the user is directed in step 504 to the application selection screen at which the user selects a secure application to launch requiring voice verification. A set of numbers or phrases (e.g., a set of five numbers or phrases) are then displayed on the screen of the user device in step 506 for the user to enter by speech. The set of numbers or phrases are then read into the microphone of the user device.

If it is determined in step 508 that the user's voice and the numbers or phrases were recognized, the secure application is launched in step 510. If the user's voice and the numbers or phrases are not recognized, the user can retry voice verification up to a set number of times, as indicated by the return path through steps 512 and 514 back to step 506. If it is determined in step 514 that the maximum number of verification attempts have been made, then the user is redirected to the login screen in step 516.

Another verification type may then be applied in accordance with the one or more verification rules previously established by the user. If a successful verification is performed using another verification type in a manner that satisfies the established rule or rules, then the secure application is launched on the device.

Referring now to FIG. 6, an exemplary process is shown for face enrollment of a user device with the verification service. The face enrollment process includes steps 600 through 616 as shown.

In step 600, the user is presented with the login screen of the verification application. When the user logs in to the verification application, the verification application searches for a camera on the device in step 602. If it is determined in step 604 that the device does not have a camera, face verification is not shown as a selectable option on the verification selection screen, as indicated in step 604. If it is determined in step 604 that the device does have a camera, then face verification is a selectable option on the verification selection screen, and the user is directed to that screen in step 608. If the user via the verification selection screen selects face verification as one of the verification types and has not previously performed the face enrollment process, the user is directed to select face enrollment.

In conjunction with the enrollment, a determination is made in step 610 regarding the particular device being utilized by the user. More particularly, this determination in the present embodiment involves determining if the user device is running an old or new version of the Android operating system. Depending upon the result of the determination in step 610, an old or new Android version is enrolled in step 612 or 616, and then the user is directed to the application selection screen as indicated in step 614.

As part of step 612 or 616, the user is prompted to take a picture of his or her face. Alternatively, the face enrollment process may prompt the user to take a video of his or her face rather than a static picture of the face. Such an arrangement facilitates a determination that the face subsequently presented for verification purposes is "live" rather than taken from a photograph. For devices running on newer operating systems such as the new Android version noted above, the verification application can make use of facial recognition software to more readily determine the face of the user. This is particularly useful for devices without front cameras as the user's face can be recognized without necessarily being in the middle of the picture frame.

FIG. 7 shows the corresponding face verification process. The process includes steps 700 through 712 as shown.

In step 700, the user is presented with the login screen. Upon successful login, the user is directed in step 702 to the application selection screen at which the user selects a secure application to launch requiring face verification. The device camera is checked in step 704. Step 704 can also be reached from step 705 as indicated by a user launching a protected application from a dashboard. The user then uses the device camera to take a picture or video of his or her face. The picture or video is referenced and may be compared to any prior picture or video previously used for face enrollment.

Depending upon the particular device, facial verification operations particularly adapted for either old or new Android operating systems are run in step 706. If it is determined in step 707 that the facial verification was successful, then the secure application on the device is launched in step 708. If the facial verification is not successful, the user can retry face verification based on a new picture or video up to a set number of times, as indicated by the return path from step 710 back to step 706. If it is determined in step 710 that the maximum number of verification attempts have been made, then the user is redirected to the login screen in step 712.

Another verification type may then be applied in accordance with the one or more verification rules previously established by the user. If a successful verification is performed using another verification type in a manner that satisfies the established rule or rules, then the secure application is launched on the device.

Referring now to FIG. 8, an exemplary process is shown for location enrollment of a user device with the verification service. The location enrollment process includes steps 800 through 810 as shown.

In step 800, the user is presented with the login screen of the verification application. When the user logs in to the verification application, the user is directed to the verification selection screen in step 802. If the user via the verification selection screen selects location verification as one of the verification types and has not previously performed the location enrollment process, the user is directed to select location enrollment.

In conjunction with the enrollment, the verification application in step 804 determines the current location of the user. This may be accomplished using, for example, techniques such as cell-tower triangulation, GPS or Wi-Fi registration. The user's current location is used as the default location, as indicated in step 805.

The user is also directed to a map screen and can then select via steps 806 and 808 multiple locations that the user wishes to use for location verification. Each time the user elects to add another location in step 808, the process returns to step 805 to allow the additional location selection in step 806. If there are no further locations to be added, the user is directed to the application selection screen in step 810.

FIG. 9 shows the corresponding location verification process. The process includes steps 900 through 918 as shown.

In step 900, the user is presented with the login screen. Upon successful login, or alternatively upon launch of a secure application requiring location verification from the application selection screen, location verification is performed in step 902. This generally involves verifying that the user device is currently located at either the default location or one of the locations selected in step 806 of the enrollment process of FIG. 8.

If it is determined in step 904 that the location verification was successful, the process moves to step 406, after which either the user is directed to the application selection screen in step 908 or the secure application is launched in step 910, depending on whether the location verification was initiated from login in step 900 or from the application selection screen in step 901. More particularly, if it is determined in step 906 that the location verification was initiated from login in step 900, the user is directed to the application selection screen in step 908, and if it is determined in step 906 that the location verification was initiated by launch of a secure application in step 901, the secure application is launched in step 910.

If it is determined in step 904 that the location verification was not successful, a further determination is made in step 912 as to whether or not the user has specified a fallback method of verification. If there is no fallback method specified, the location verification fails in step 914, and the user is directed to the application selection screen or the login screen as indicated in step 915. If there is at least one fallback method specified, verification using the fallback method is performed as indicated by steps 916 and 918. This may be viewed as one of the additional verification types selected by the user as part of a verification rule in the manner previously described, or as a separate fallback method or methods associated only with failure of location verification.

As a more particular example, multiple instances of third party verification may be available as respective fallback methods. Assume that there are four different available fallback methods, namely, a call, a short message service (SMS) link, SMS passcodes, or another type of verification request, although additional or alternative methods, in any combination, may be made available for use in a given embodiment. The user can select one or more of these fallback methods via the verification selection screen. The SMS passcodes are also referred to herein as SMS token codes.

The various fallback methods utilized in this example all involve directing a communication to a specified other phone number that is different than the phone number of the user device. It is assumed for purposes of this example that the user device is a mobile telephone.

For the call fallback method, a call is placed to the specified other phone number, and the user is prompted to press one or more specific phone keys.

For the SMS link fallback method, an SMS link is sent to the specified other phone number, and the user clicks on or otherwise selects the SMS link.

For the SMS token codes fallback method, SMS token codes are sent to the specified other phone number, and the user manually enters the received SMS token codes into the user device.

For the fallback method utilizing another type of verification request, the request is sent to the specified other phone number, and the user performs the corresponding verification action.

Upon successful completion of the specified fallback method, the secure application is launched on the user device.

As indicated above, numerous alternative combinations of fallback methods could be used. It is also possible that a given fallback method can make use of local verification via Bluetooth or other short-range protocol.

Similar fallback methods may be established for other verification types as part of one or more verification rules established by a user.

As in the voice and face verification processes of respective FIGS. 5 and 7, another verification type may then be applied in accordance with the one or more verification rules previously established by the user. If a successful verification is performed using another verification type in a manner that satisfies the established rule or rules, then the secure application is launched on the device.

Additional examples of rules-based multi-factor verification will now be described with reference to FIGS. 10 and 11. It is to be appreciated, however, that numerous other combinations of multiple verification types can be used.

In these and other embodiments, the sequence in which the selected types of verification are to be applied may be specified in the form of multiple security levels in which each such level requires satisfaction of at least one of the selected types of verification. The selected types of verification at a given level may be combined using a logic AND function, such that all of the verification types at that level need to be satisfied. Alternatively, the selected types of verification at a given level may be combined using a logic OR function, such that only one of the verification types at that level needs to be satisfied. Numerous other combinations of verification types may be specified using these and other logic functions as part of one or more verification rules.

Figure 10:
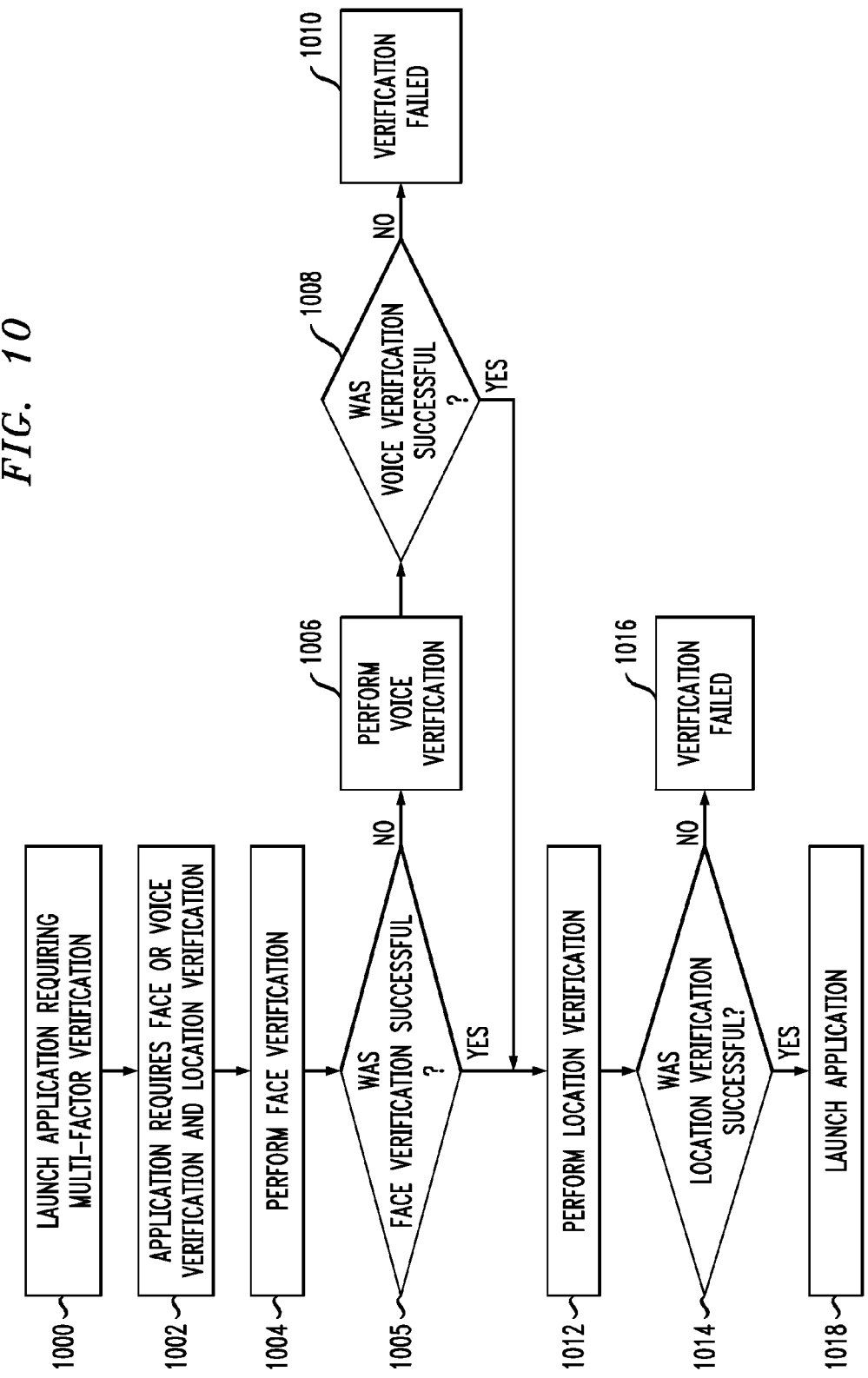
FIG. 10 is a flowchart of an example of rules-based multi-factor verification.

Referring now to FIG. 10, an arrangement is illustrated in which face verification OR voice verification is required in a first security level, AND location verification is required in a second security level. The first level of security in this arrangement may therefore be viewed as having one specified fallback method of verification, namely, voice verification, while the second level of security does not have any specified fallback method of verification. This exemplary rules-based multi-factor verification process as illustrated includes steps 1000 through 1018.

In step 1000, an attempt is made to launch a secure application requiring rules-based multi-factor verification. Upon initiation of the launch, it is determined that the application requires face OR voice verification in a first security level AND location verification in a second security level, as indicated in step 1002. Accordingly, in step 1004 the face verification is performed. If it is determined in step 1005 that the face verification is not successful, the voice verification is performed in step 1006.

If either the face verification or the voice verification was successful, as determined in respective steps 1005 and 1008, the process moves to step 1012 to perform location verification. If both the face verification and the voice verification are not successful, the verification fails as indicated in step 1010. The verification will also fail if the location verification is not successful, as indicated by steps 1014 and 1016. However, if one of the face and voice verification is successful, and the location verification is successful, the secure application is permitted to launch as indicated in step 1018. Accordingly, in this example, a user must complete either face and location verification or voice and location verification in order to gain access to the application being launched.

Figure 11:
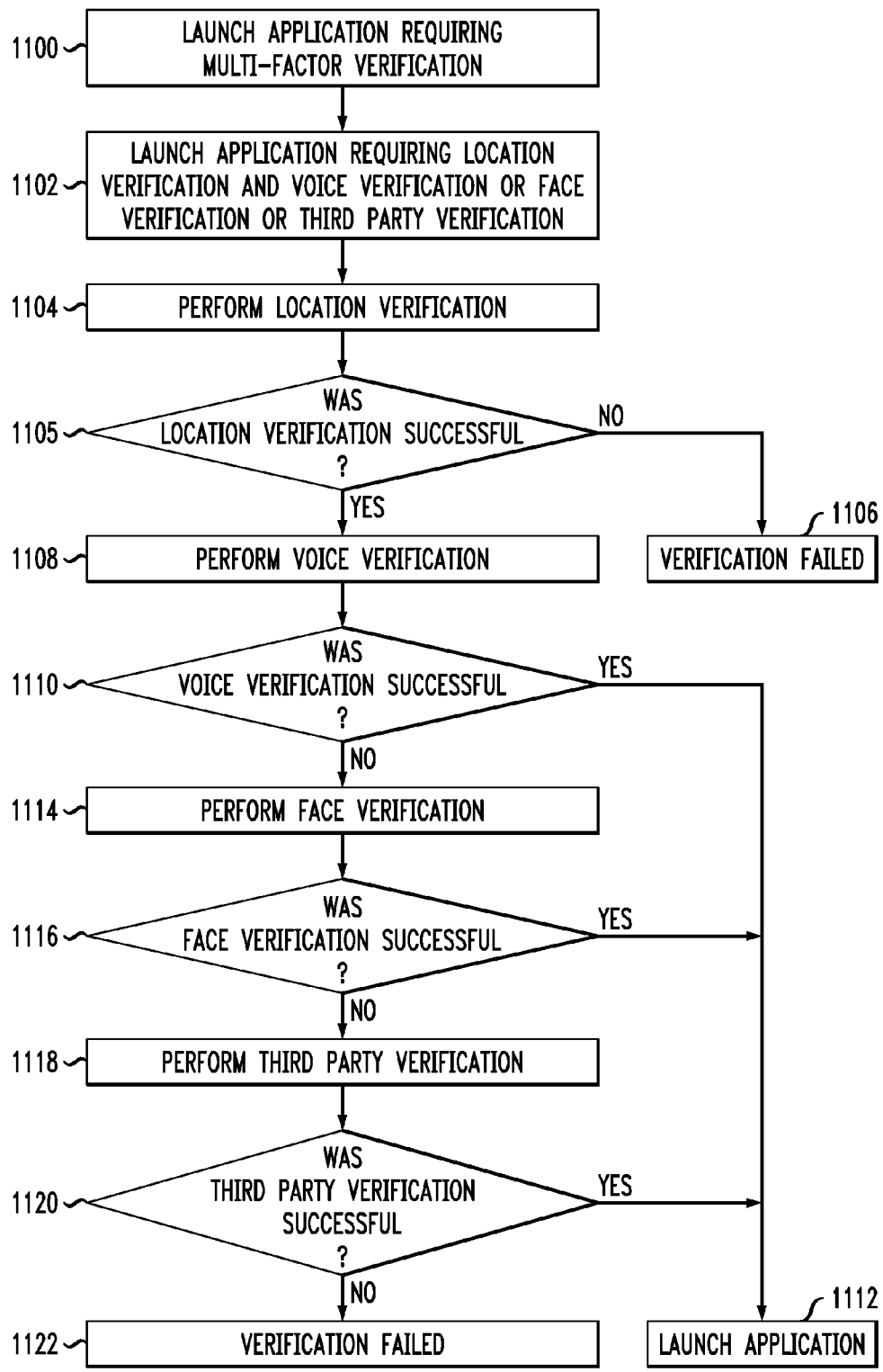
FIG. 11 is a flowchart of a second example of rules-based multi-factor verification.

A second example of rules-based multi-factor verification is shown in FIG. 11. More particularly, an arrangement is illustrated in which location verification is required in a first security level, AND voice verification, face verification OR third party verification is required in a second security level. The first level of security in this arrangement may therefore be viewed as having not having any specified fallback method of verification, while the second level of security has two distinct fallback methods after voice verification, namely, face verification and third party verification. This exemplary rules-based multi-factor verification process as illustrated includes steps 1100 through 1122.

In step 1100, an attempt is made to launch a secure application requiring rules-based multi-factor verification. Upon initiation of the launch, it is determined in step 1102 that the application requires location verification in a first security level, AND voice verification OR face verification OR third party verification in a second security level. Accordingly, in step 1104 the location verification is performed. If it is determined in step 1105 that the location verification is not successful, the verification fails as indicated in step 1106.

If the location verification was successful, as determined in step 1105, the process moves to step 1108 to perform voice verification. If the voice verification is successful, as determined in step 1110, the secure application is permitted to launch in step 1112. Otherwise, the face verification is performed in step 1114 and if determined to be successful in step 1116 will permit launch of the application. If the face verification is not successful, as determined in step 1116, the third party verification is performed in step 1118 and if determined to be successful in step 1120 will permit launch of the application.

If voice verification, face verification and third party verification all fail, then the overall verification process fails as indicated in step 1122. However, if the location verification is successful, and one of the voice, face and third party verification is successful, the secure application is permitted to launch as indicated in step 1112. Accordingly, in this example, a user must successfully complete location verification and either voice, face or third party verification in order to gain access to the application being launched.

Again, numerous other alternative configurations of verification rules comprising sequences of verification types arranged in multiple security levels may be implemented using AND, OR and other logic functions.

The third party verification referred to in certain embodiments above may be performed, for example, by storing the voice and face recording of the user requesting verification, and forwarding this information to a third party recipient for verification. The third party recipient may be selected by the verification platform in accordance with the established verification rules. For example, the verification platform may select a third party recipient from the user's social network or from the user's organizational hierarchy. In the latter case, the third party recipient may be selected as a party to whom the user reports or another party with adequate authority to approve or decline the request for verification. Once the selected third party recipient receives the request (e.g., via SMS or email), he or she is provided with options to approve or decline the request for access by the user. Accordingly, the response is sent back to the user requesting verification.

As indicated above, other fallback methods or alternative verification types that could be used as part of rules-based multi-factor verification in embodiments of the invention include, but are not limited to, calling a specified device and requesting verification, and using SMS to send a verification link or verification token codes to a specified device.

It is to be appreciated that processing operations and other system functionality such as that described in conjunction with FIGS. 1 through 11 can be implemented at least in part in the form of one or more software programs stored in memory and executed by a processor of a processing device such as a computer or server. As will be described below, a memory or other storage device having such program code embodied therein is an example of what is more generally referred to herein as a "processor-readable storage medium."

Also, the particular processing operations and other system functionality described in conjunction with the flowcharts of FIGS. 1 through 11 are presented by way of illustrative example only, and should not be construed as limiting the scope of the invention in any way. Alternative embodiments can use other types of processing operations for rules-based multi-factor verification or other types of verification of user identity implemented using one or more user devices and a verification platform. For example, the ordering of the process steps may be varied in other embodiments, or certain steps may be performed concurrently with one another rather than serially.

It was noted above that in some embodiments, two or more user devices are utilized to implement multi-factor verification. If two devices are used for verification then the two devices need not communicate with one another directly but instead can communicate through a verification platform.

Figure 12:
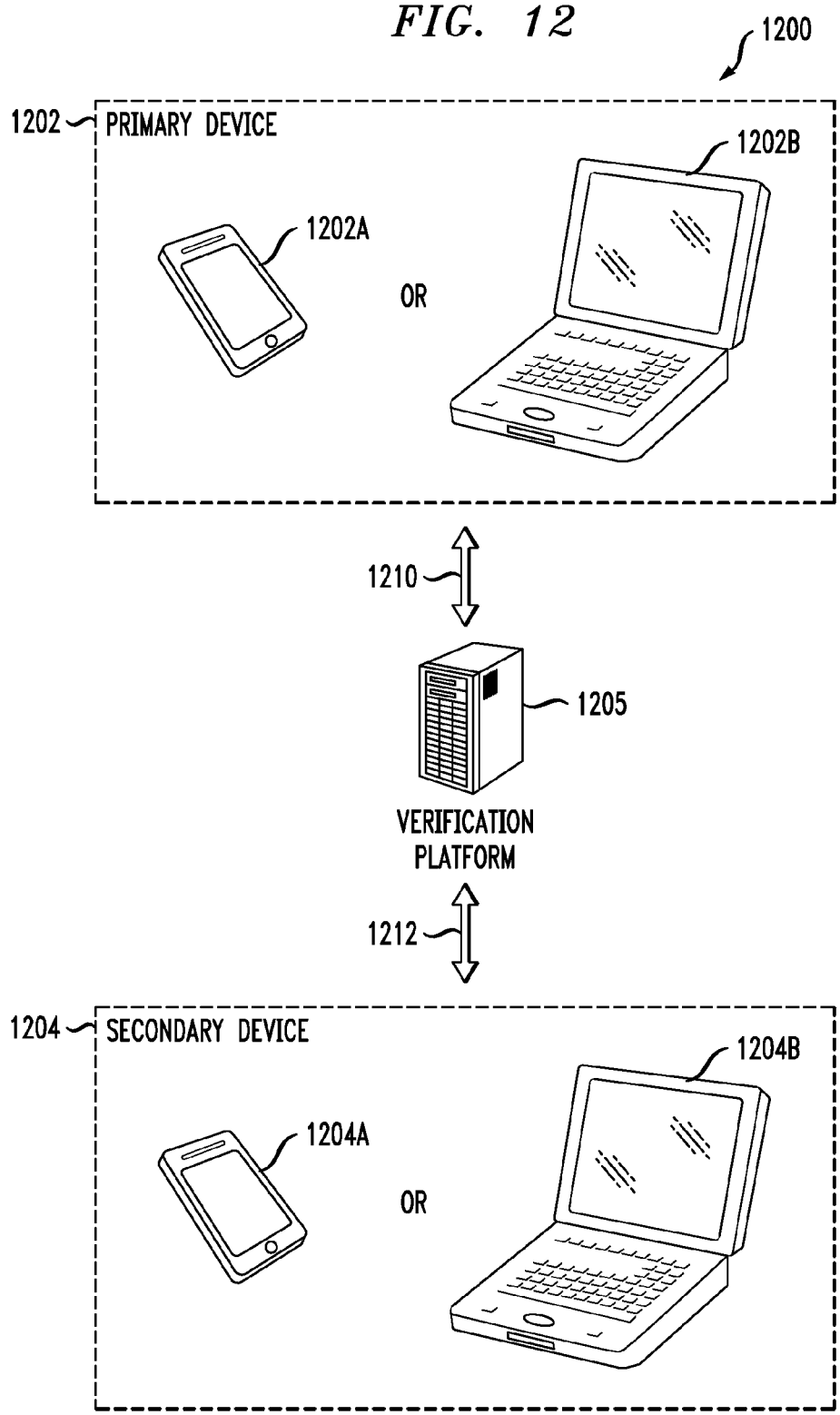
FIG. 12 shows an exemplary communication system comprising primary and secondary devices that communicate with a verification platform supporting the verification service.

An exemplary communication system in an embodiment of this type is shown in FIG. 12. In this embodiment, a communication system 1200 comprises a primary device 1202, a secondary device 1204 and a verification platform 1205 arranged between the primary and secondary devices. The verification platform 1205 communicates with the primary and secondary devices 1202 and 1204 via respective communication channels 1210 and 1212. In the present embodiment, there is no pairing or other direct communication required between the primary and secondary devices. The primary device 1202 is illustratively shown as comprising one of a mobile telephone 1202A or a laptop computer 1202B. Similarly, the secondary device 1204 is illustratively shown as comprising one of a mobile telephone 1204A or a laptop computer 1204B. As mentioned previously, a wide variety of other types of electronic devices may be used in other embodiments.

The primary device 1202 and the secondary device 1204 are both configured to run the rules-based multi-factor verification application.

The verification platform 1205 is configured to include a verification platform API and a verification platform server as noted above, but may comprise additional or alternative components in other embodiments.

In the FIG. 12 embodiment, a verification request is sent from the primary device 1202 and processed by the verification platform 1205 to determine an appropriate notification to send to the secondary device 1204. The secondary device is used to provide verification input to the verification platform responsive to the notification and in accordance with the selected verification types so as to thereby control access to an application on the primary device. It is assumed that verification agents of the type previously described run on both the primary and secondary devices, and information is sent from a given such verification agent to the verification platform API in encrypted form. The verification platform API communicates with the verification platform server to determine one or more verification rules and to process verification input in the manner previously described.

Again, the user verification techniques in such an embodiment do not require that the two devices be in close proximity to one another, as in the above-noted conventional pairing arrangements using Bluetooth or other short-range protocols. The use of the verification platform as an intermediary between the primary and secondary devices also allows for enhanced communication security, thereby reducing vulnerability to hacking.

The primary device 1202 in the FIG. 12 embodiment may be viewed as the first user device in other embodiments described herein.

In some embodiments, other types of verification in addition to or in place of the above-described voice, face, location, motion or third party verification can be used. For example, numeric token verification or approve/decline verification may be used. Numeric token verification can be implemented by sending digits to the secondary device. The digits must then be entered into the primary device within a predetermined length of time to determine verification. Approve/decline verification can be implemented by sending a message with the option to either approve or decline to the secondary device. From the secondary device, a user can allow verification by selecting approve or can deny verification by selecting decline. Other types of verification based on behavioral knowledge, gestures, colors or other types of information may be used, in any combination.

Figure 13:
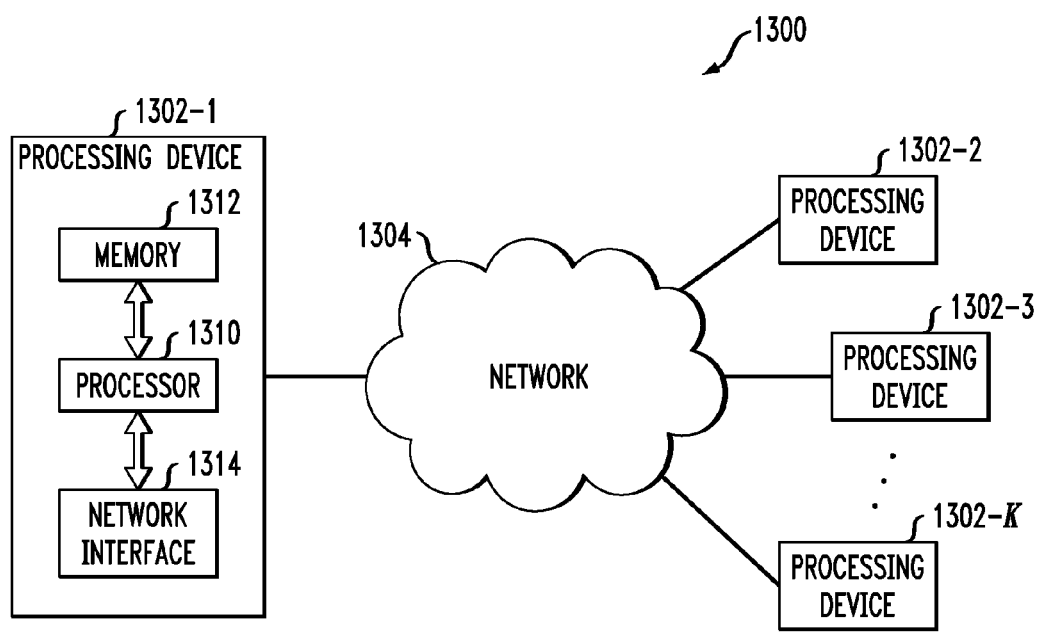
FIG. 13 shows an example of a set of processing devices that may be utilized to implement at least a portion of the communication system of FIG. 12.

The communication system 1200 or portions thereof may be implemented using one or more processing platforms. For example, verification platform 1205 may be implemented on a processing platform comprising a plurality of networked processing devices. An example of such a processing platform is processing platform 1300 shown in FIG. 13.

The processing platform 1300 in this embodiment comprises a portion of system 1200 and includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a wide area network (WAN), a local area network (LAN), a satellite network, a telephone or cable network, a cellular network, a wireless network such as WiFi or WiMAX, or various portions or combinations of these and other types of networks.

The processing device 1302-1 in the processing platform 1300 comprises a processor 1310 coupled to a memory 1312. The processor 1310 may comprise a microprocessor, a microcontroller, an application-specific integrated circuit (ASIC), a field-programmable gate array (FPGA) or other type of processing circuitry, as well as portions or combinations of such circuitry elements, and the memory 1312, which may be viewed as an example of a processor-readable storage medium having executable computer program code embodied therein, may comprise random access memory (RAM), read-only memory (ROM) or other types of memory, in any combination.

Also included in the processing device 1302-1 is network interface circuitry 1314, which is used to interface the processing device with the network 1304 and other system components, and may comprise one or more conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and communication system 1200 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the communication system 1200. Such components can communicate with other elements of the communication system 1200 over any type of network or other communication media.

As indicated previously, components of a communication system as disclosed herein can be implemented at least in part in the form of one or more software programs stored in memory and executed by a processor of a processing device such as one of the processing devices 1302. As noted above, a memory or other storage device having such program code embodied therein is an example of what is more generally referred to herein as a processor-readable storage medium.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

It should again be emphasized that the above-described embodiments of the invention are presented for purposes of illustration only. Many variations and other alternative embodiments may be used. For example, the particular types and arrangements of user devices, verification platforms and applications used in a given embodiment can be varied, as can the particular types of messaging or other communications exchanged between system components. Also, a wide variety of different types of verification rules, verification types, sequences and security levels may be used other than those explicitly described herein. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
    receiving, at a verification platform from a first device, a verification request, the verification platform being adapted for communication with a verification application running on the first device;
    identifying, at the verification platform, one or more verification rules previously established by a user of the first device for processing of the verification request;
    sending, from the verification platform to the first device, a notification regarding said one or more verification rules;
    receiving, at the verification platform from the first device, verification input responsive to the notification;
    granting or denying the verification request, at the verification platform, based at least in part on the received verification input;
    wherein said one or more verification rules specify multiple distinct types of verification selected by the user and a sequence in which the selected types of verification are to be applied in processing the verification request;
    permitting the user via the verification application to designate one or more additional applications on the first device as protected applications;
    permitting the user via the verification application to designate respective distinct sets of one or more verification rules to be applied before access is granted to the protected applications;
    generating the verification request in conjunction with an attempted launch of a given one of the protected applications on the first device; and
    applying the sequence of the selected types of verification, the sequence comprising multiple security levels in which each such level requires satisfaction of at least one of the selected types of verification;
    wherein a given one of the security levels comprises a primary type of verification and at least one fallback type of verification to be used in the event that the primary type of verification fails, the at least one fallback type of verification involving utilization of a second device distinct from the first device.

2. The method of claim 1 wherein sending a notification regarding said one or more verification rules comprises sending the notification to the first device and wherein receiving verification input responsive to the notification comprises receiving the verification input from the first device.

3. The method of claim 1 further comprising:
    receiving information characterizing said one or more verification rules from the verification application on the first device; and
    storing said information in a memory of the verification platform external to the first device.

4. The method of claim 1 wherein the notification identifies particular verification input to be provided in accordance with at least one of the selected types of verification specified by said one or more verification rules.

5. The method of claim 1 wherein the multiple distinct types of verification comprise two or more of voice verification, face verification, location verification, motion verification and third party verification.

6. The method of claim 1 wherein the given security level is configured so as to require satisfaction of only one of a corresponding plurality of the selected types of verification associated with that level.

7. The method of claim 1 wherein user access to the given protected application on the first device is controlled responsive to the granting or denying of the verification request.

8. The method of claim 7 further comprising sending a notification of the granting or denying of the verification request to a verification agent running on the first device wherein the verification agent controls user access to the given protected application on the first device responsive to said notification of the granting or denying.

9. The method of claim 1 wherein sending a notification regarding said one or more verification rules comprises sending the notification to the second device and wherein receiving verification input responsive to the notification comprises receiving at least a portion of the verification input from the second device.

10. The method of claim 1 wherein the given security level comprises two or more fallback types of verification to be used in the event that the primary type of verification fails, the two or more fallback types of verification each involving utilization of the second device distinct from the first device.

11. The method of claim 1 wherein said at least one fallback type of verification comprises a remote verification that directs a communication to the second device via a phone number different than a phone number associated with the first device.

12. The method of claim 11 wherein the communication to the second device comprises one of a short message service (SMS) link and a SMS token code.

13. The method of claim 1 wherein said at least one fallback type of verification comprises a local verification that directs a communication to the second device via a short-range wireless protocol through which the first device and the second device are connected.

14. An article of manufacture comprising a non-transitory processor-readable storage medium having embodied therein one or more software programs, wherein the one or more software programs when executed by at least one processing device cause the at least one processing device:
    to receive, at a verification platform from a first device, a verification request, the verification platform being adapted for communication with a verification application running on the first device;
    to identify, at the verification platform, one or more verification rules previously established by a user of the first device for processing of the verification request;

to send, from the verification platform to the first device, a notification regarding said one or more verification rules;

to receive, at the verification platform from the first device, verification input responsive to the notification;

to grant or deny the verification request, at the verification platform, based at least in part on the received verification input;

wherein said one or more verification rules specify multiple distinct types of verification selected by the user and a sequence in which the selected types of verification are to be applied in processing the verification request;

to permit the user via the verification application to designate one or more additional applications on the first device as protected applications;

to permit the user via the verification application to designate respective distinct sets of one or more verification rules to be applied before access is granted to the protected applications;

to generate the verification request in conjunction with an attempted launch of a given one of the protected applications on the first device; and to apply the sequence of the selected types of verification, the sequence comprising multiple security levels in which each such level requires satisfaction of at least one of the selected types of verification;

wherein a given one of the security levels comprises a primary type of verification and at least one fallback type of verification to be used in the event that the primary type of verification fails, the at least one fallback type of verification involving utilization of a second device distinct from the first device.

15. The article of manufacture of claim 14 wherein the given security level comprises two or more fallback types of verification to be used in the event that the primary type of verification fails, the two or more fallback types of verification each involving utilization of the second device distinct from the first device.

16. An apparatus comprising:
a verification platform comprising at least one processing device having a processor coupled to a memory, the verification platform being adapted for communication with a verification application on a first device;
wherein the verification platform is configured:
to receive a verification request from the verification application on the first device;
to identify one or more verification rules previously established by a user of the first device for processing of the verification request;
to send, to the first device, a notification regarding said one or more verification rules;
to receive, from the first device, verification input responsive to the notification; and
to grant or deny the verification request based at least in part on the received verification input;
wherein said one or more verification rules specify multiple distinct types of verification selected by the user and a sequence in which the selected types of verification are to be applied in processing the verification request;
wherein the verification platform is further configured:
to permit the user via the verification application to designate one or more additional applications on the first device as protected applications;
to permit the user via the verification application to designate respective distinct sets of one or more verification rules to be applied before access is granted to the protected applications;
to generate the verification request in conjunction with an attempted launch of a given one of the protected applications on the first device; and
to apply the sequence of the selected types of verification, the sequence comprising multiple security levels in which each such level requires satisfaction of at least one of the selected types of verification;
wherein a given one of the security levels comprises a primary type of verification and at least one fallback type of verification to be used in the event that the primary type of verification fails, the at least one fallback type of verification involving utilization of a second device distinct from the first device.

17. The apparatus of claim 16 wherein the verification platform comprises:
an application programming interface adapted for communication with a verification agent implemented on the first device; and
a server coupled to the application programming interface.

18. The apparatus of claim 17 wherein the server is configured:
to identify the one or more verification rules in a first server session invoked by the application programming interface responsive to receipt of the verification request; and
to grant or deny the verification request in a second server session invoked by the application programming interface responsive to receipt of the verification input.

19. The apparatus of claim 16 wherein the verification platform is part of a communication system comprising a plurality of user devices including the first device and the second device.

20. A method comprising:
sending, from a first device to a verification platform external to the first device, information characterizing one or more verification rules, said one or more verification rules being established by a user of the first device, the verification platform being adapted for communication with a verification application on the first device;
sending, from the first device to the verification platform, a verification request;
receiving, at the first device from the verification platform, a notification regarding said one or more verification rules;
sending, from the first device to the verification platform, verification input responsive to the notification;
wherein the verification platform grants or denies the verification request based at least in part on the verification input;
wherein said one or more verification rules specify multiple distinct types of verification selected by a user and a sequence in which the selected types of verification are to be applied in processing the verification request;
permitting the user via the verification application to designate one or more additional applications on the first device as protected applications;
permitting the user via the verification application to designate respective distinct sets of one or more verification rules to be applied before access is granted to the protected applications;
generating the verification request in conjunction with an attempted launch of a given one of the protected applications on the first device; and
applying the sequence of the selected types of verification, the sequence comprising multiple security levels in which each such level requires satisfaction of at least one of the selected types of verification;

wherein a given one of the security levels comprises a primary type of verification and at least one fallback type of verification to be used in the event that the primary type of verification fails, the at least one fallback type of verification involving utilization of a second device distinct from the first device.

* * * * *